S. B. SEXTON.

3 Sheets—Sheet 1.

Stove.

No. 1,621.

Reissued Feb. 16, 1864.

Witnesses
R. T. Campbell
O. Shepard

Inventor
S. B. Sexton
by his Atty,
Munn & Co

N. PETERS, Photo-Lithographer, Washington, D. C.

S. B. SEXTON.

3 Sheets—Sheet 2.

Stove.

No. 1,621.

Reissued Feb. 16, 1864.

Witnesses
R. T. Campbell
E. Schafer

Inventor
S. B. Sexton
by his Atty
Mason Fenwick & Lawrence

N. PETERS, Photo-Lithographer, Washington, D. C.

S. B. SEXTON.
3 Sheets—Sheet 3.
Stove.
No. 1,621.
Reissued Feb. 16, 1864.
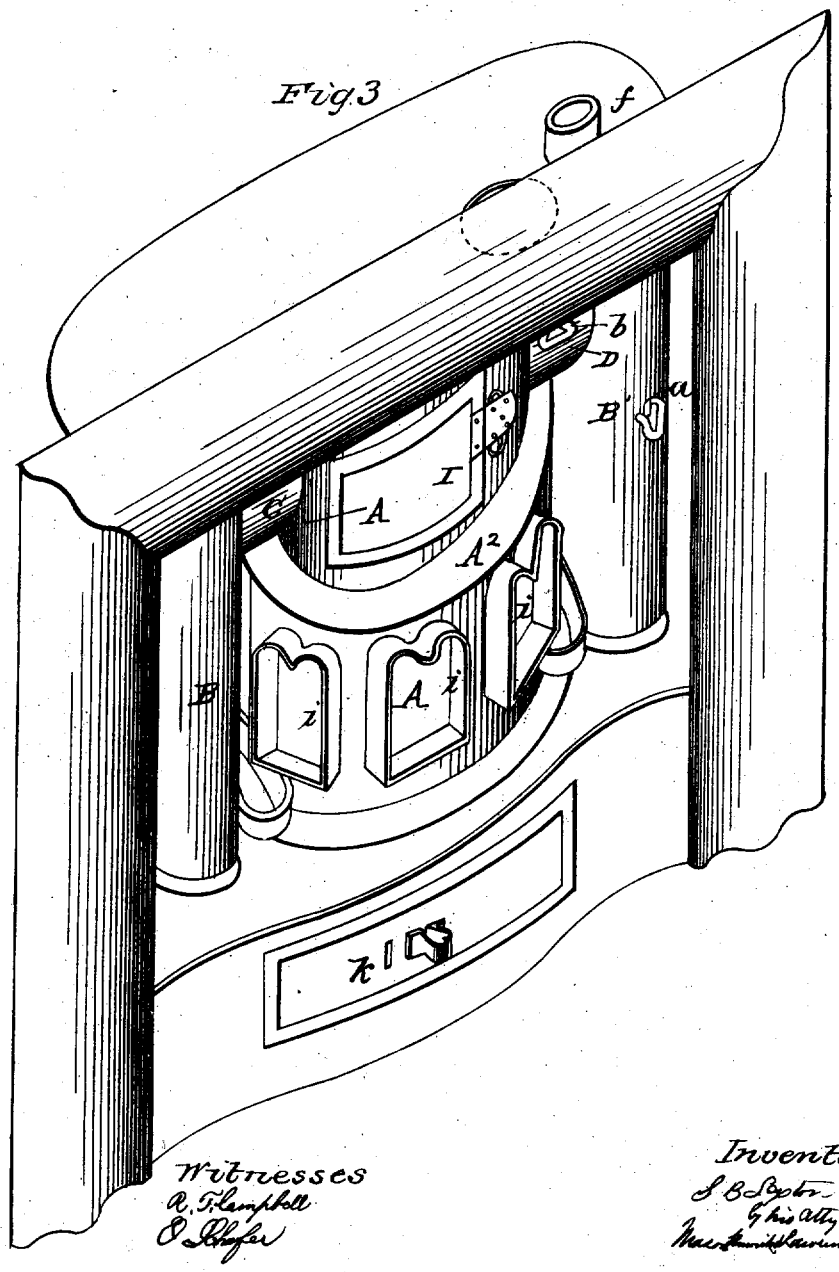
Witnesses
A. F. Campbell
O. Schäfer
Inventor
S. B. Sexton
by his atty
Marcus Smith Lawrence
N. PETERS, Photo-Lithographer, Washington, D. C.

UNITED STATES PATENT OFFICE.

SAMUEL B. SEXTON, OF BALTIMORE, MARYLAND.

IMPROVEMENT IN STOVES.

Specification forming part of Letters Patent No. 23,716, dated April 19, 1859; Reissue No. 1,242, dated December 3, 1861; Reissue No. 1,621, dated February 16, 1864.

DIVISION No. 1.

*To all whom it may concern:*

Be it known that I, S. B. SEXTON, of Baltimore, in the State of Maryland, have invented a new and useful Improvement in Stoves for Heating Purposes; and I do hereby declare that the following is a full, clear, and exact description of the same, reference being had to the accompanying drawings, forming part of this specification, in which—

Figure 1:
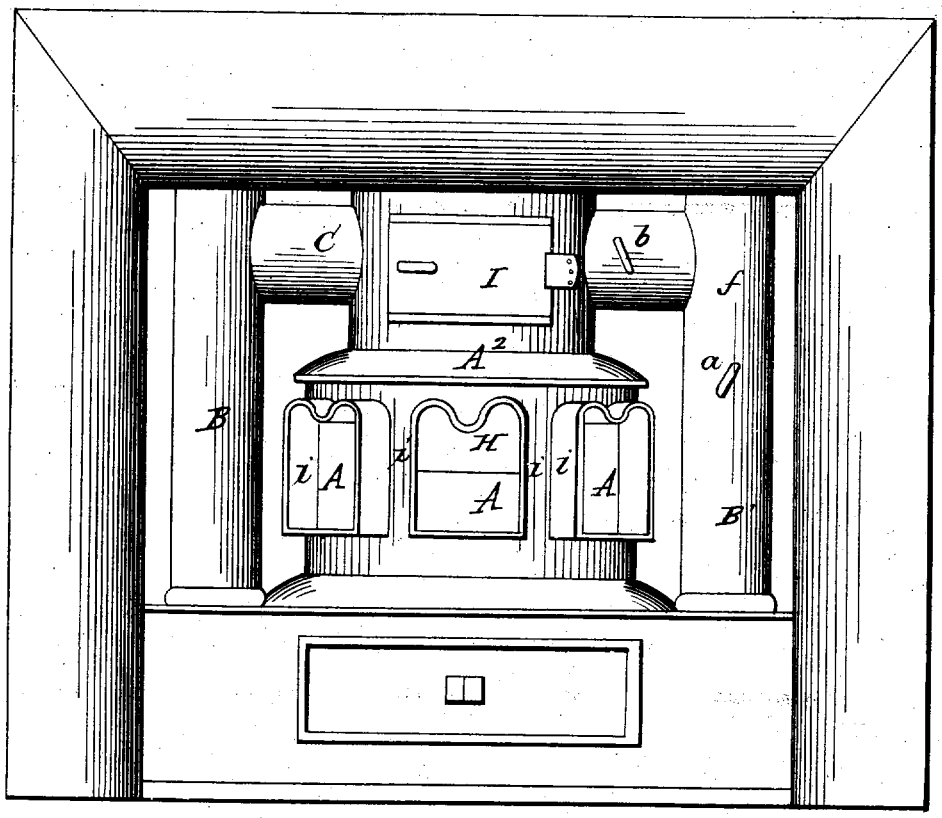
Figure 2:
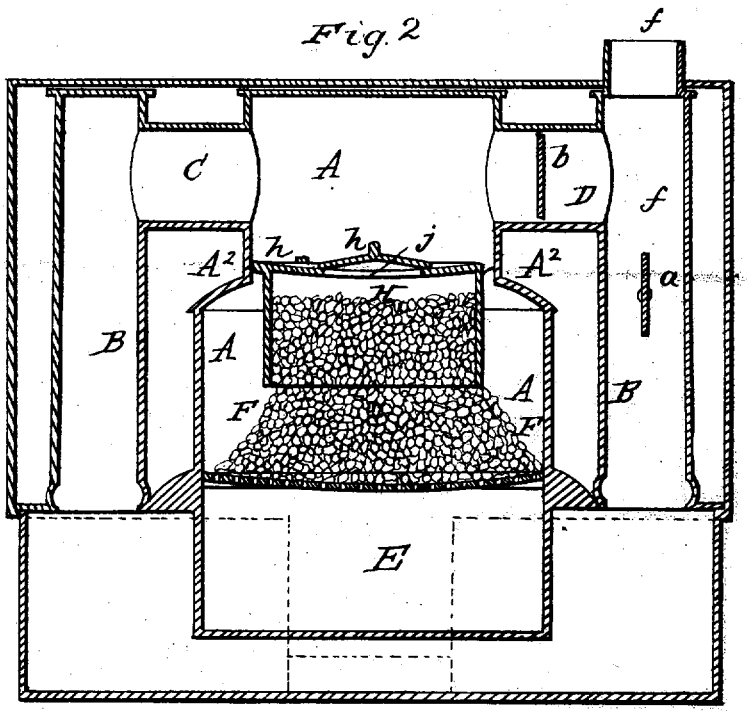

Figure 1 is a front elevation of a stove with my invention applied to it. Fig. 2 is a vertical longitudinal section of the same. Fig. 3 is a perspective view of the stove.

Similar letters of reference in the several figures indicate corresponding parts.

The nature of my invention consists, first, in so applying a fuel-supply and concentrating magazine within a stove which has a combustion-chamber of larger diameter than the magazine that an unobstructed space extending to the wall, or lining of the wall of the stove, between the grate and the magazine, is formed, and a space around and above the magazine is secured for the expanded and highly-ignited gases to circulate through, the gases coming directly in contact with the cover of the magazine.

It is very essential in order to obtain sufficient heat from this class of stoves to have the coal which is supplied from the magazine to freely spread out laterally from the lower end of the magazine and to burn near or directly against the wall or lining of the stove. It is equally as essential, in order to economize fuel, to have the superincumbent mass of supply-coal confined, until needed, within a central magazine. It is further important, in this connection, to have the gases that are evolved or emitted from the incandescent mass of coals circulate in the upper apartment of the stove, toward the exit and in direct contact with the cover of the magazine, in order, first, to heat the upper part of the stove; and, second, to prevent the insinuation of air down into the magazine through the crevice where the cover is fitted to it. The circulation of hot gases over the cover toward the main exit or draft flue causes all inflowing cold air to be carried off to said flue, and thus rapid combustion in the magazine from the entrance of air at top is prevented.

My invention is applicable to stoves with a single cylinder, or to stoves with side columns, which serve as diving-flues, such stoves, in either case, standing out in the room. It is also applicable, as represented, to fire-place stoves; but as I have patented the fire-place stove under a separate patent, I do not here claim that application of the invention.

To enable others skilled in the art to make and use my invention, I will proceed to describe the same.

I shall describe my stove as constructed with an upper and lower apartment, because my invention, when applied, divides the interior chamber into two apartments.

A is the lower apartment of the stove, constituting, with its own wall, the combustion-chamber. The interior lower portion of this apartment is to be, as usual, lined with fire-brick or other durable material. I generally use brick, beveled off on their inner upper corner, so as to form an inclined bed around the edges of the grate. The grate G, on which coal is burned in this apartment, is equal in diameter to the combustion-chamber, or of equal diameter thereto less the thickness of the fire-brick. Under this grate the usual ash-pan is placed, in a base, E, which base may be constructed either hollow or solid around or beneath the ash-pan, in any of the known ways.

Through the wall of A illumination-apertures *i* are formed, and around each of them a projecting window or door frame is formed, into which, or in front thereof, mica or other transparent material is placed. Through these apertures, by removing the windows or doors, the fire is kindled on the grate and under the magazine. A is the upper apartment of the stove. This apartment may only communicate (directly) with a chimney-flue, *f*, by a branch, D, located at its back, or at any other point desired; or it may have one or more side columns, B B′, leading into the hollow base and connecting thus indirectly with the chimney-flue *f*—the respective columns or flues to be controlled by dampers *a* or *b*. The arrangement of flues and dampers, however, is no part of my invention under this patent.

The apartment A′ is furnished with a door, I, at its front, so that coal may be introduced into the apartment A. This location of the door may be changed to suit circumstances.

The stove is divided into the two apartments A A′ by a bottomless magazine or coal concentrator and supplier, H. This magazine is closed at top, except at its center, where a hole, *j*, is cut. This is the supply-hole, and the same is closed with a removable cover, *h*. The diameter of the magazine is less than that of the interior of the stove, and it is arranged centrally within the stove so that its lower end reaches down about midway of the depth of the apartment A.

At the point where the gases escape from the apartment A into A′ there ought to be a contraction of the gas-passage by means of a horizontal or nearly horizontal plate. In the drawings I have shown one way of contracting this gas space, as illustrated at $A^2$, but inasmuch as the reverberation of the gases at this point is the object desired to be accomplished, and such result can be produced in various analogous ways to that shown, I do not limit myself to this exact construction.

In locating the supports of the magazine it is advisable to place them as far out of contact with the incandescent mass of coals as practicable, in order to save them from rapid destruction from the heat. In the drawings they are shown as being at the upper end of the fuel-magazine, as indicated by the letter *p*, but so far as the principle of operation of my invention is concerned, the effect would be the same if the magazine was supported by supports located at any other point on the walls of the stove.

When the fuel-magazine is properly applied within the stove, there will be a gas-space between the supports all round it, and between the magazine and the wall of the stove. There will also be an unobstructed space, F, below the magazine, extending to the wall of the stove. There will likewise be a larger space for circulation of the gas above the magazine, all of said spaces communicating with one another, and being in connection with the draft-flue *f*. Thus the gases flow into the apartment A′ when the cover *h* is closed, and the draft is downward so far as the interior of the magazine is concerned, but upward on the outside of the magazine.

One of the great features of my invention is a stove with a fuel-magazine so applied that the gases are thrown off in an undivided body from a thin layer of incandescent coal, which occupies a larger area than the superincumbent supply in the magazine, directly against the radiating-surface of the stove at points below the lower end of the magazine. Another important feature, directly connected with the one just stated, is that the gases thus thrown off have a chance to circulate freely in contact with the radiating-surface at points between the radiating-surface and the magazine, and above the magazine in the apartment A′, directly in contact with the cover of the magazine, and from thence to and through the exit or chimney flue. Thus the most perfect combustion, radiation, and illumination are secured.

Another important feature in my stove is the combination of the illumination kindling-apertures and a fuel-magazine, which admits of the kindling material being placed on the grate under it.

The most advantageous manner of using this invention is as follows: To kindle the fire the damper *b*, the door I, and the draft-door *k* in the ash-pan are opened, the cover *h* removed, and a plentiful supply of kindling placed on the grate G, under the magazine, through the illumination-window frames. The kindling being ignited, a moderate supply of coal is introduced into the magazine and the door I closed. The draft being now directly upward through the fuel-magazine, the coal is in a short time thoroughly ignited. The fuel-magazine is now to be completely filled with coal, the cover *h* closed upon the opening *j*, and the door shut. When this mass of coal is sufficiently heated throughout, the damper *b* is partly or wholly closed—that is, if no diving-flues are used; but if diving-flues are employed the damper *b* may always be kept entirely closed after the fire is fully started, and a damper, *a*, be used as the regulator in connection with the draft door *k*.

I have found that the stove when in full burning or blast will burn slowly with both dampers and the draft-door closed, or nearly closed, and it is advisable to thus adjust the regulators on going to bed, as the fuel will then consume but slowly during the night.

The coal in the part A of the stove being perfectly incandescent outside of the range of the magazine when the fire is at full blast, the greatest possible amount of heat and light are evolved and emitted, and as the front of the stove is provided with windows directly opposite the incandescent mass of fuel, and as all descending gases from the supply-coal are burned as they pass over the red coals, a brilliant and cheerful appearance is presented to view.

What I claim as my invention, and desire to secure by Letters Patent, is—

1. A stove for warming purposes, constructed with a fuel-supply magazine supported free from the grate, and a combustion-chamber having a base surface of greater diameter than the fuel-magazine, substantially as and for the purpose set forth.

2. In combination with the above, constructing the combustion-chamber with projecting window or mica frames, substantially as described.

3. A stove for warming purposes, embracing the features of construction named in my first claim, and the additional feature of the gas-circulating apartment above the fuel-magazine, substantially as and for the purpose set forth.

4. A stove for warming purposes, wherein the flowing of the coals in a lateral direction from the lower end of the fuel-magazine is wholly unobstructed, and at the same time the combustion-chamber is formed by the outer wall of the stove, and the products of combustion circulate underneath, around, over, and in contact with the fuel-magazine, whatever may be the form and relative proportions of the parts, substantially as and for the purpose set forth.

5. The combination of a fuel-magazine which has its lower end free from the grate G with a stove which has illumination doors or windows in its wall A, so that the fire may be kindled through the apertures or door-frames, substantially as set forth.

SAMUEL B. SEXTON.

Witnesses:
R. T. CAMPBELL,
E. SCHAFER.